United States Patent [19]

Sawada et al.

[11] 4,189,959
[45] Feb. 26, 1980

[54] BIDIRECTIONAL DRIVING MECHANISM

[75] Inventors: Kiyoshi Sawada, Shizuoka; Katsuo Yamazaki, Numazu, both of Japan

[73] Assignee: Toshiba Kikai Kabushiki Kaisha, Tokyo, Japan

[21] Appl. No.: 877,670

[22] Filed: Feb. 14, 1978

[30] Foreign Application Priority Data

Feb. 17, 1977 [JP] Japan .................. 52-16477

[51] Int. Cl.² ........................................... F16H 47/00
[52] U.S. Cl. ..................................... 74/720; 64/26; 74/665 GC; 409/146
[58] Field of Search ............ 74/29, 30, 409, 665 GC, 74/720, 665 F, 665 B, 665 GA, 440; 90/22; 64/26

[56] References Cited

U.S. PATENT DOCUMENTS

| | | | |
|---|---|---|---|
| 2,468,964 | 5/1949 | Dunn et al. | 74/720 |
| 3,396,594 | 8/1968 | Walker | 74/409 |

*Primary Examiner*—Nile C. Byers, Jr.
*Assistant Examiner*—Conrad Berman
*Attorney, Agent, or Firm*—Koda and Androlia

[57] ABSTRACT

In a bidirectional driving mechanism comprising a rack, two pinions meshing with the rack, and gear trains through which power is transmitted respectively to the pinions from a common driving source, at least one gear of the gear train is formed as a ring gear and a plurality of variable volume oil chambers containing pressurized oil are formed between the ring gear and the shaft thereof so that driving torque is transmitted from the ring gear to the gear shaft through the oil chambers.

3 Claims, 4 Drawing Figures

BIDIRECTIONAL DRIVING MECHANISM

BACKGROUND OF THE INVENTION

This invention relates to a bidirectional driving mechanism contained in a feed drive system of a numerically controlled machine tool, for example, for improving servo-characteristics of the machine tool by eliminating backlash and improving mechanical rigidity of the feed drive system.

Generally, it is known that the backlash and the mechanical rigidity of the feed drive system of a numerically controlled machine tool affect adversely the servo-characteristics of the machine tool and cause the lowering of the positioning accuracy of the machine tool. Particularly, in a closed loop type drive system, the backlash and the mechanical rigidity of the drive system cause an adverse effect on the accuracy of the servo-characteristics and likely cause the hunting of the machine tool, which result in the unstable operation of the system.

Since a drive system is constituted by the combination of a driving source and various component elements, the rigidity of the drive system can be improved by increasing the rigidity of respective component elements. Accordingly, the rigidity of the drive system does not vary linearly depending upon the accuracy of the component elements and the error in tightening them and in certain portions of the drive system the rigidity is extremely low.

In order to obviate the above defects of the prior art numerically controlled machine tools or the like; that is, in a double-pinion type drive system in which two pinions are meshing with a rack used for the drive system of the machine tool, the servo-characteristics have been improved by eliminating the backlash and by improving the mechanical rigidity of the drive system by adopting such two systems as (1) a system in which gears of a gear train for driving pinions are helical gears to one of which driving power is continuously applied axially in one direction by means of a hydraulic cylinder or a cup-shaped spring and (2) a system in which two pinions are driven by independent gear trains and a drive source provided with braking means.

However, in the system (1) since the helical gears have surfaces having friction larger than that of a spur gear, the helical gear is not smoothly driven when the direction of rotation is reversed, and furthermore, in the case where a cup-shaped spring is used for urging the helical gear, it is troublesome to adjust a previously applied pressure. In the system (2), an expensive device and control mechanism are required.

FIG. 1 shows a diagrammatic view of a conventional double-pinion drive system of the type wherein power is transmitted to the pinions from one drive source through independent gear trains.

With this drive system, pinions 2 and 3 are engaging with a rack 1 and to these pinions there are secured one ends of shafts 4 and 5 and spur gears 6 and 7 are attached to the other ends of the shafts. The spur gears 6 and 7 are meshing with spur gears 8 and 9 to which shafts 10 and 11 are connected respectively at one ends and to the other ends of these shafts spur gears 12 and 13 are secured. A spur gear 14 is meshing with the spur gears 12 and 13 and secured to one end of a shaft 15 and the other end of the shaft 15 is secured to a bevel gear 16. To this bevel gear 16 another bevel gear 17 is meshed and a drive motor 18 is connected to the bevel gear 17. In this arrangement, when the motor 18 operates, the pinion 2 is driven through the bevel gears 17, 16, and spur gears 14, 12, 8, and 6, and the pinion 3 is also driven through the bevel gears 17, 16, and spur gears 14, 13, 9, and 7.

However, this closed loop type drive system constituted by the rack 1, the pinions 2 and 3, the spur gears 6, 7, 8, 9, 12, 13, and 14 and shafts 4, 5, 10, and 11 produces backlash and possesses a partially inferior mechanical rigidity.

SUMMARY OF THE INVENTION

Accordingly, a main object of this invention is to obviate the defects such as backlash in the drive system of a numerically controlled machine tool, for example, and to improve the mechanical rigidity of the drive system and the servo-characteristics of the machine tool.

Another object of this invention is to provide a bidirectional driving mechanism having a mechanism for eliminating backlash and contained in one member of the drive system, for example, in spur gear 13 in FIG. 1.

A further object of the invention is to improve the positioning accuracy of a table of a machine tool by the provision of a bidirectional driving mechanism.

According to this invention, there is provided a bidirectional driving mechanism of the type comprising a rack, two pinions meshing with the rack, and gear trains through which power is transmitted respectively to the pinions from a common driving source, and in this bidirectional driving mechanism, at least one of the gears of the gear train is formed as a ring gear and a plurality of variable volume oil chambers containing pressurized oil are formed between the ring gear and the shaft thereof so that driving torque is transmitted from the ring to the gear shaft through the oil chambers.

DESCRIPTION OF THE PREFERRED EMBODIMENT

Figure 1:
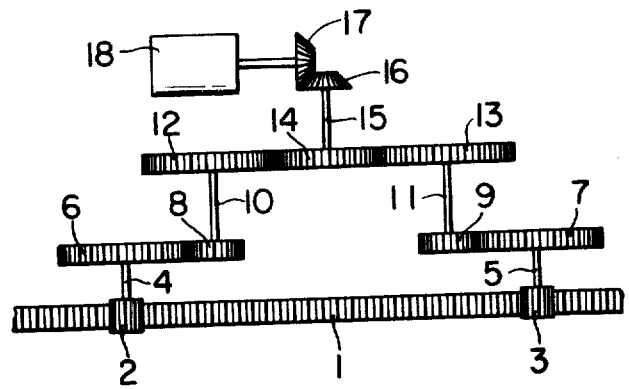
FIG. 1 is a diagrammatic view of a double-pinion type drive system of a prior art.
Figure 2:
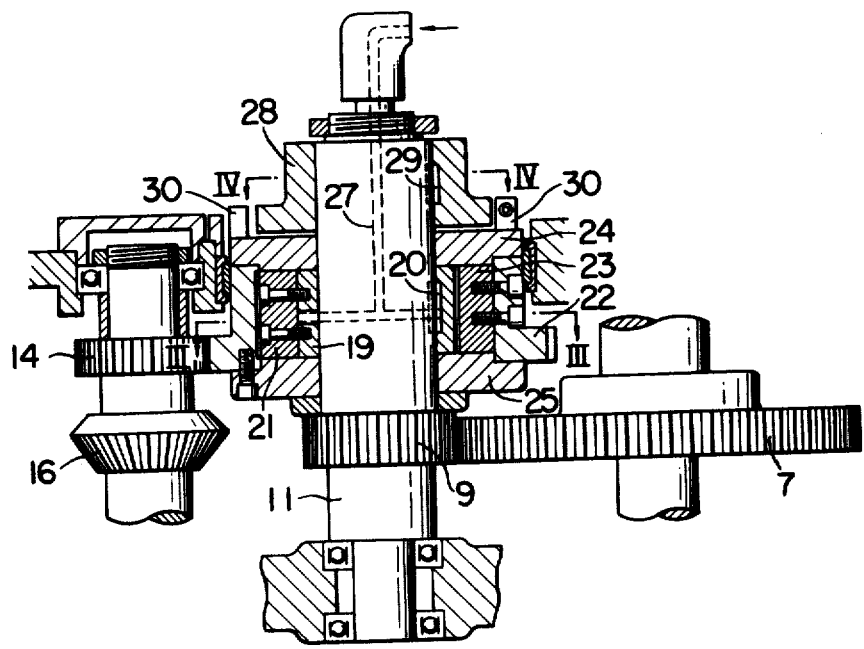
FIG. 2 is a cross sectional view of a backlash eliminating mechanism of this invention and contained in one element of a bidirectional driving mechanism.

FIG. 2 shows the backlash eliminating mechanism contained in one element of the drive system, for example, in the spur gear 13 shown in FIG. 1. In FIG. 2, elements corresponding to those in FIG. 1 are designated by the same reference characters, and as shown, a sleeve 19 is mounted on the shaft 11 by means of a key 20 and the outer periphery of the sleeve 19 is divided into three parts by partition plates 21 fixed to the outer periphery of the sleeve 19. The outer surfaces of the partition plates 21 are in contact with the inner surface of a ring gear 22 which meshes with the spur gear 14, and partition plates 23 in contact with the outer cylindrical surface of the sleeve 19 are secured to the inner surface of the ring gear 22 for dividing the inner surface into three parts. A upper cover 24 and a lower cover 25 are secured respectively to the upper and lower ends of the sleeve 19, the partition plates 21, 23 and the ring gear 22 for clamping therebetween the ring gear 22.

Figure 3:
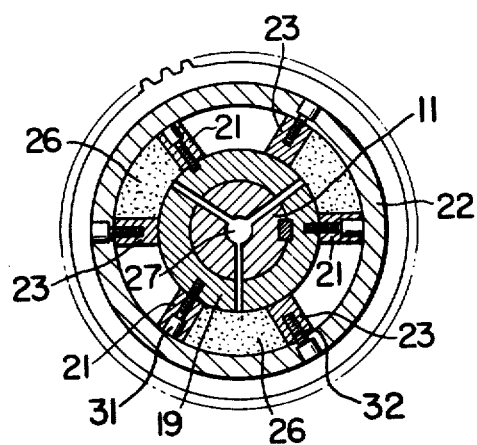
FIG. 3 is a cross sectional view taken along the line III—III in FIG. 2.
Figure 4:
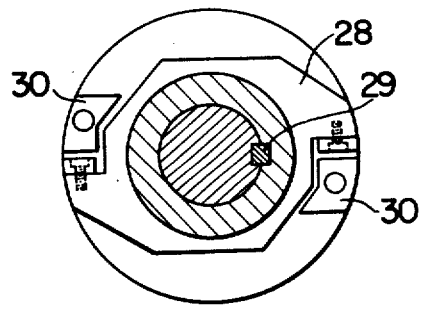
FIG. 4 is a cross sectional view taken along the line IV—IV in FIG. 2.

Six chambers are defined by the sleeve 19, the partition plates 21 and 23, the ring gear 22 and the upper and lower covers 24 and 25 (FIG. 3). Of the six chambers three are used as oil chambers 26, the volume of each of which is reduced when the sleeve 19 and the ring gear 22 are rotated in the opposite direction. An oil passage 27 extending along the axis of the shaft 11 is communicated with the oil chambers 26. As is understood from FIGS. 2 and 3, the torque from the bevel gear 16 is transmitted through the spur gear 14 to the ring gear 22 meshing therewith. The ring gear 22 operatively contacts to the partition plates 21 and 23 and the oil chambers 26 which also operatively connect to the shaft 11 through the sleeve 19. Thus, the torque is transmitted to the shaft 11. A stop member 28 is secured to the shaft 11 by means of a key 29, and a block 30 is attached to the upper cover 24 to limit the movement of the stop member 28 (FIG. 4).

The operation of the bidirectional driving mechanism according to this invention will now be described hereunder.

Prior to the starting of the motor 18, pressurized oil is fed into the oil chambers 26 from an oil source (not shown), and the pressurized oil causes the clockwise movement of the shaft 11 and the anti-clockwise movement of the ring gear 22 by acting upon partition plates 21 and 23 because when the pressurized oil is fed into the oil chamber 26, the pressure in the chambers increases and acts on the partition plates 21 and 23, but the partition plates 21 are secured at one end to the sleeve 19 by bolts 31 and the partition plates 23 are secured at one end to the ring gear 22 by bolts 32, and the free ends of the partition plates 21 and 23 contact the inner surface of the ring gear 22 and the outer surface of the sleeve 19, respectively. Thus, the increased pressure strongly acts on the free ends of the partition plates 21 and 23, thereby causing the sleeve 19, i.e. the shaft 11, to rotate clockwisely and the ring gear 22 anticlockwisely. In this state, when power is transmitted to the pinions 2 and 3 from the motor 18 to drive a table through the gear trains, in the closed loop type drive system which is constituted by the ring gear 22 containing the backlash eliminating mechanism shown in FIG. 2, the spur gears 9 and 7, the pinion 3, the rack 1, the pinion 2, the spur gears 6, 8, 12, and 14 and the shafts 11, 4, 5, and 10, since the ring gear 22 receives the anti-clockwise torque, the pinion 3 is engaging the rack by the teeth flanks opposite to those of the pinion 2, thereby eliminating the backlash of the drive system and improving the mechanical rigidity thereof to improve the servocharacteristics of the machine tool.

In one example, where the rack 1 is fixed to a bed and the drive system is mounted on a table, to cut a workpiece secured to the table by reciprocating the table by the pinions 2 and 3, and when boring working, is carried out under a condition in which the table moving direction is different from the working direction, the backlash in the drive system can be eliminated, the servocharacteristics is improved and the positioning accuracy is also increased by presetting the oil pressure in the oil chambers 26 to a pressure required for withstanding only a drive torque necessary for moving the table. On the other hand, when a heavy milling operation is carried out under a condition in which the table moving direction is the same as the working direction, cutting reaction of the milling cutter is added to the table driving force, so that the table is not sufficiently driven only by the oil pressure for driving the table. However, in this case, the volume of the oil chambers 26 is reduced and the stop member 28 engages the block 30 as a safety mechanism so as to transmit a driving power thereby advancing the table. This engagement of the stop member 28 with the block 30 eliminates a fear that the partition plates 21 and 23 will be damaged when the volume of the oil chamber 26 is reduced. In this case, the drive system cannot manifest the backlash eliminating function, but in actual milling working, it is not a problem because the positioning accuracy is not important. Furthermore, when a high drive torque is applied to the table driving system, the cutting operation, due to the engagement of the stop member 28 and the block 30 which act as a safety mechanism, power transmission can be assured. However, the stop member and the block can be eliminated by applying highly pressurized oil to the oil chambers 26 sufficient to bear the table driving torque.

Further, it should be noted that instead of the construction shown in the embodiment, sleeve 19 may be integrally formed with the gear shaft 11 or the sleeve 19 and the ring gear 22 may be integrally formed with the upper and lower covers 24 and 25.

Although the advantages according to this invention are clear from the foregoings, they are summarized as follows.

Since any helical gear is not used in the backlash eliminating mechanism of this invention, the drive system has less friction and excellent response for forward-to-reverse rotation in comparison with the drive mechanism of a conventional double-pinion type drive system. The cup-shaped spring is not used, so that the mechanism can be easily adjusted and constructed as a compact structure at low cost in comparison with a conventional independent type drive system. Furthermore, even in the case where over load is accidentally applied to the system or abnormal state occurs in the hydraulic system to lower the pressure, the occurrence of the backlash more than a certain level can be prevented.

What is claimed is:

1. In a bidirectional driving mechanism of the type comprising a rack, two pinions meshing with said rack, and gear trains through which power is transmitted respectively to said pinions from a common driving source, the improvement wherein at least one of the gears of said gear train is a ring gear provided on a shaft and a plurality of variable volume oil chambers containing pressurized oil are formed between said ring gear and the shaft of said ring gear so that driving torque is transmitted from said ring gear to said shaft through said oil chambers.

2. The bidirectional driving mechanism according to claim 1 wherein there is provided stop means for coupling directly said ring gear to said shaft when the variable volume of said oil chambers is reduced to a predetermined volume.

3. The bidirectional driving mechanism according to claim 1 wherein chambers are defined by a first group of circumferentially spaced apart radial partition plates secured to said shaft and a second group of circumferentially spaced apart radial partition plates secured to the inner side of said ring gear, the radial partition plates of said first and second groups being interleaved with each other, and pressurized oil is admitted into spaced apart chambers to form said oil chambers.

* * * * *